Patented May 23, 1939

2,159,908

UNITED STATES PATENT OFFICE 2,159,908

METHOD OF PRODUCING STABLE SOLUTIONS OF SULPHUR IN MINERAL AND OTHER OILS

Edward A. Nill, Highland Park, Mich.

No Drawing. Application April 20, 1937,
Serial No. 138,007

4 Claims. (Cl. 87—9)

This invention relates to a method of producing a soluble sulphur and more particularly to a method of producing stable solutions of sulphur in mineral and other oils.

Lubricants employed in metal working operations such as drawing and cutting should have very high film strength and high heat capacity. These lubricants usually are mineral oils or a mixture of mineral oils and animal or vegetable oils to which may be added various ingredients for increasing film strength and the heat absorbing capacity of the lubricant. Sulphur has been found to be very effective for these purposes. The method heretofore commonly employed has been to add to mineral oil a sulphurized fatty oil which is produced by heating a mixture of sulphur and oil for a considerable length of time to a temperature of about 450° F. Lubricating compositions so made are of very dark color, almost black, and a considerable portion of the sulphur is chemically combined with the oil. The dark color is objectionable in cutting operations because it makes it very difficult for the operator to see the action of the cutter on the metal. Another disadvantage is that the stain made by the lubricant on the metal is difficult to remove. Also, the sulphur compounds in the lubricant give it a disagreeable odor and are poisonous, causing painful skin irritations.

The present invention has for its object to provide a method of making stable solutions of sulphur in mineral oil which contain a percentage of sulphur at least as high as obtained by the use of sulphurized fatty oils, which is of light color, transparent, odorless, and non-poisonous.

The process of the present invention consists in first converting the sulphur into a form more readily soluble in mineral oil and then dissolving the sulphur in mineral oil.

I have discovered that if sulphur be dissolved in a solvent at a temperature slightly above the melting point of sulphur but at temperatures below that which the sulphur changes to a dark brown color, the sulphur which is precipitated upon cooling of the liquid is much more soluble in mineral oils than any commercial forms of sulphur.

The solvent used may be a mineral, vegetable or fatty oil or any other solvent from which a substantial proportion of the sulphur will precipitate upon cooling. The liquid solvent is heated to a temperature of from 250° to 260° F. and sulphur, either rock sulphur or flowers of sulphur is stirred into the liquid until a substantially saturated solution is obtained. The solution is then allowed to cool and sulphur is precipitated in the form of very fine needlelike crystals. The precipitate is then added to mineral or other oil at a temperature slightly below the melting point of sulphur. The crystalline sulphur precipitate will readily dissolve in the oil and remain in solution after the oil is cooled. Solutions of sulphur in mineral oil containing from 2% to 5% sulphur can readily be made by the method above described. These solutions are of a light yellow color and quite transparent. The precipitated sulphur may be filtered from the solvent and washed without affecting its solubility in mineral and other oils but if the solvent employed is one which does not injuriously affect the lubricating qualities of the oil to which the precipitate is to be added, it is usually more convenient to simply allow the precipitate to settle, draw off the clear solvent and add the sulphur sediment together with as much of the solvent as remains mixed with the precipitated sulphur. A small quantity of the lighter fractions of mineral oil does not injuriously affect the lubricating properties of a mineral oil lubricating composition. Lard oil is a desirable ingredient of cutting and drawing lubricants. Either a light mineral oil or lard oil can be advantageously used as a sulphur solvent. Certain chemical compounds which are known to be advantageous ingredients of cutting or drawing lubricants also are capable of dissolving substantial percentages of sulphur at a temperature slightly above the melting point of sulphur and of precipitating substantial quantities of sulphur upon cooling. Examples of such chemical compounds are tricresyl phosphate and chlorinated paraffin, either of which may be employed as the solvent for sulphur.

Other sulphur solvents which will take a substantial quantity of sulphur into solution at from 250° to 265° and from which a substantial quantity of sulphur will precipitate upon cooling may be employed. If the solvent is undesirable in the lubricating composition, the sulphur can be filtered out and washed prior to its addition to the lubricating oil.

Furthermore, it is to be understood that the particular procedure set forth is presented for purposes of explanation and illustration and that various procedures can be followed without departing from my invention as defined in the appended claims.

What I claim is:

1. The process of making solutions of sulphur in mineral oil which consists in dissolving sulphur in a solvent at a temperature slightly above the melting point of sulphur, allowing the solution to cool and precipitate sulphur, and adding sulphur so precipitated to a mineral oil heated to a temperature somewhat below the melting point of sulphur.

2. The process of making solutions of sulphur in mineral oil which consists in dissolving sulphur in a solvent at a temperature of about 250° to 265° F., allowing the solution to cool and precipitate sulphur, and adding sulphur so precipitated to a mineral oil heated to a temperature of about 150°.

3. The herein described method of making a stable solution of sulphur in mineral oils, which comprises making a substantially saturated solution of sulphur in an organic liquid solvent at a temperature above the melting point of sulphur but below a temperature at which the solution is discolored, allowing the solution to cool and precipitate sulphur, separating the precipitated sulphur from the solvent, and dissolving sulphur so precipitated in a mineral oil at a temperature somewhat below the melting point of sulphur.

4. The herein described method of making a stable solution of sulphur in a mineral oil which comprises dissolving the sulphur in an oil at temperature slightly above the melting point of sulphur, allowing the solution to cool and precipitate sulphur, and adding sulphur so precipitated to mineral oil at a temperature below the melting point of sulphur.

EDWARD A. NILL.